United States Patent [19]
Guigonis et al.

[11] Patent Number: 5,389,591
[45] Date of Patent: Feb. 14, 1995

[54] MIXTURE OF GRAINS AND PARTICLES OF VITREOUS SILICA, AND NEW MATERIAL MADE OF SINTERED VITREOUS SILICA

[75] Inventors: Jacques, M. L. Guigonis, Entraigues sur Sotgues; Eric T. G. Jorge, Avignon, both of France

[73] Assignee: Societe Europeenne des Produits Refractaires, Courbevoie, France

[21] Appl. No.: 63,689

[22] Filed: May 20, 1993

[30] Foreign Application Priority Data

May 22, 1992 [FR] France ................... 92 06276

[51] Int. Cl.⁶ ............................................. C04B 35/14
[52] U.S. Cl. .................................................... 501/133
[58] Field of Search .................................. 501/54, 133

[56] References Cited

U.S. PATENT DOCUMENTS 4,297,309  10/1981  North .
4,506,025  3/1985   Kleeb et al. .
4,929,579  5/1990   Lassiter .

FOREIGN PATENT DOCUMENTS 62-216959  9/1987  Japan .
9112216    8/1991  WIPO .

*Primary Examiner*—Karl Group
*Attorney, Agent, or Firm*—Watson, Cole, Grindle & Watson

[57] ABSTRACT

The invention relates especially to a mixture of grains and particles of fused vitreous silica produced by dry mixing: (i) a moderately coarse particle size fraction of fused vitreous silica, (ii) a fine particle size fraction of fused vitreous silica, in which at least 95% by weight of the grains are smaller than 40 $\mu$m, (iii) substantially spherical particles of fume silica, and (iv) optionally, at least one particle size fraction of fused vitreous silica which is coarser than fraction (i), the constituents (i) to (iv) being employed in the following proportions by weight: (i) 15–70%, (ii) 15–55%, (iii) 3–15% and (iv) 0–52%. The mixture can be used for the production of articles made of sintered vitreous silica.

8 Claims, 1 Drawing Sheet

MIXTURE OF GRAINS AND PARTICLES OF VITREOUS SILICA, AND NEW MATERIAL MADE OF SINTERED VITREOUS SILICA

The invention relates to a new process for the production of a refractory material made of sintered vitreous silica, to a new mixture of grains and particles of vitreous silica and to a new material made of sintered vitreous silica.

Articles made of sintered vitreous silica are useful in applications requiring the use of a refractory material which has a low coefficient of expansion, low heat conductivity and good chemical inertness.

At present, articles made of sintered vitreous silica are employed industrially:

- in metallurgy, above all in nonferrous metallurgy such as, for example, in the casting of aluminium alloys, brass and bronze (casting spouts, nozzles, sampling spoons, crucibles), of zinc (thermocouple protection) and of magnesium (electrolysis cell blocks);
- in chemistry, for the manufacture of titanium, and in petrochemistry (components for chlorine exchanger tubes); in laboratory equipment; in acid-resistant coating;
- in furnace components such as rollers of heat treatment furnaces in glass manufacture and in iron and steel manufacture;
- in mould components for thermoformable composites or forming platens for thin metal sheets;
- in glassmaking, for example for the production of feeder gates for "float" glass furnaces, of sacrificial components both for soda-lime glass furnaces and for special glass furnaces (for example as plungers, stirrers, jackets, open pots) and as tank blocks for optical glass furnaces. The use of sintered silica is advantageous in the glassmaking field because of its low heat expansion which makes it resistant to thermal shocks and because, in contact with molten glasses, silica corrodes but does not give rise to faults such as stones or cords in the glass, because it is "digested" by the latter, being one of its main constituents.

However, this use is limited by its relatively low resistance to corrosion by molten glasses.

The conventional process for producing articles made of sintered vitreous silica involves casting a slip (aqueous fluid mix) of vitreous silica particles into a plaster mould, the porosity of which makes it possible to remove most of the water present in the slip by capillary suction and to stiffen or set the cast article, allowing it to be demoulded. The cast article is then matured, dried and sintered by firing at high temperature, for example at about 1100°–1150° C. After cooling, the article obtained can be machined.

However, the slip employed in this process exhibits the defect of requiring a long time to prepare. Typically, the starting point is grains of fused vitreous silica which are finely ground in a wet medium, for example in a ball mill, and then various coarser particle size fractions of fused vitreous silica are incorporated into the resultant suspension of fine particles (approximately 10–40 μm) until a homogeneous supension is obtained. This suspension produced in a wet medium must then be "stabilised" by being continuously stirred in a tank for a period of 8–13 hours. This long stabilisation operation is essential for obtaining a stable rheological behaviour of the suspension or slip. In its absence, problems are encountered when the slip is being cast, such as the formation of shrinkage cavities and heterogeneous texture, which have the effect of producing a final material exhibiting deteriorated properties after firing.

Typically, materials made of sintered vitreous silica which are obtained by the above process have a density of 1.9 t/m$^3$, an open porosity of 12–13%, a heat expansion coefficient of $0.6 \times 10^{-6}$/K, and a rupture modulus of 12–20 MPa.

There is therefore a need for a process for the production of a refractory material made of sintered vitreous silica which is easier and less arduous to implement, while producing a material with properties which are not deteriorated, and even improved.

The objective of the invention is to provide such a process.

More precisely, the invention relates to a process for the production of a refractory article made of sintered vitreous silica comprising the steps of casting a fluid mixture of water and of particles of vitreous silica into a porous mould, of allowing most of the water present in the cast mixture to be removed through the pores of said mould so that the cast article in the mould solidifies, of extracting the solidified article from the mould, of drying this article and of sintering the dried article at high temperature, process wherein the fluid mixture is prepared as follows:

A) a mixture of grains and particles of fused vitreous silica is prepared by dry mixing:
  (i) a moderately coarse particle size fraction of fused vitreous silica, in which at least 80% by weight of the grains are between 40 μm and 1 mm,
  (ii) a fine particle size fraction of fused vitreous silica, in which at least 95% by weight of the grains are smaller than 40 μm, the said silica grains (ii) having a BET specific surface of 6 to 9 m$^2$/g and a median diameter, as measured by sedimentation analysis, of 5 to 6 μm;
  (iii) substantially spherical particles of a fume silica other than the fume silicas originating from the production of ferrosilicons or of silicon, and
  (iv) optionally, at least one particle size fraction of fused vitreous silica which is coarser than fraction (i), the constituents (i), (ii), (iii) and (iv) being employed in the following proportions by weight in relation to the total weight of (i)+(ii)+(iii)+(iv): (i) 15–70%, (ii) 15–55%, (iii) 3–15% and (iv) 0–52% and the constituents (i), (ii) and (iv) being comprised of a fused vitreous silica containing at least 99% of silica;

B) a fluid mixture is prepared from the mixture obtained in (A) and from a quantity of water representing not more than 10% by weight relative to the total weight of the mixture obtained in (A).

The fluid mixture thus produced can be employed immediately and does not require any stabilising operation, which is very advantageous.

The fluid mixtures can be divided into two categories, depending on whether they do or do not contain the optional ingredient (iv).

The fluid mixtures without ingredient (iv) can be employed as a slip in a conventional slip casting process where the removal of the water takes place by a capillary suction effect through the pores in the porous mould, usually made of plaster. In this case the fluid mixture will usually contain 8 to 10% water. On the other hand, the fluid mixtures including the ingredient (iv) can be employed in a process for casting in a porous mould with the application of vibrations (vibrational casting) intended to improve the filling of the mould and where the removal of the water takes place chiefly by evaporation. In this case the fluid mixture will usually contain a smaller quantity of water than in the preceding case, namely a quantity of the order of 5 to 7%.

The invention also relates to a mixture of grains and particles of fused vitreous silica, which is produced by dry mixing:

(i) a moderately coarse particle size fraction of fused vitreous silica, in which at least 80% by weight of the grains are between 40 μm and 1 mm, (ii) a fine particle size fraction of fused vitreous silica, in which at least 95% by weight of the grains are smaller than 40 μm, the said silica grains (ii) having a BET specific surface of 6 to 9 m²/g and a median diameter, as measured by sedimentation analysis, of 5 to 6 μm;

(iii) substantially spherical particles of fume silica other than the fume silicas originating from the production of ferrosilicons or of silicon, and (iv) optionally, at least one particle size fraction of fused vitreous silica which is coarser than fraction (i), the constituents (i), (ii), (iii) and (iv) being employed in the following proportions by weight in relation to the total weight of (i)+(ii)+(iii)+(iv): (i) 15–70%, (ii) 15–55%, (iii) 3–15% and (iv) 0–52% and the constituents (i), (ii) and (iv) being comprised of a fused vitreous silica containing at least 99% of silica.

The ingredients (i), (ii), (iii) and (iv) are advantageously employed in the following percentages, depending on whether the intention is to produce a slip or a fluid mixture for vibrational casting.

| Ingredients | Slip | | Mixture for vibrational casting | |
| --- | --- | --- | --- | --- |
| | Broad | Preferred | Broad | Preferred |
| (i) | 30–70 | 40–60 | 15–35 | 20–30 |
| (ii) | 15–55 | 27–40 | 15–35 | 20–30 |
| (iii) | 3–15 | 7–13 | 3–15 | 7–13 |
| (iv) | — | — | 27–52 | 33–47 |

The grain size of the particle size fraction(s) (iv) preferably does not exceed 10 mm.

The invention additionally relates to a new refractory material made up of sintered grains of fused vitreous silica, which further contains substantially spherical particles of fume silica which are visible in the form of dispersed separate entities in a photomicrograph, said grains of fused vitrous silica containing at least 99% of silica, and said fume silica being a fume silica other than the fume silicas originating from the production of ferrosilicons or of silicon.

During the manufacture of the refractory article care must be taken to introduce as little as possible of components which behave as fluxes for silica or (so-called "mineralising") components capable of promoting the devitrification of vitreous silica into crystobalite, because the latter exhibits an anomaly in heat expansion on cooling at a temperature of 200° to 230° C., which results in rupture of the articles. Examples of such components are $Al_2O_3$, $Fe_2O_3$, alkali metal compounds (such as $Na_2O$ and $K_2O$) and alkaline earth metal compounds (such as CaO).

Care must also be taken to exclude as far as possible components such as SiC and carbon, which cause the material to bubble in contact with molten glasses.

Grains of fused vitreous silica which have a silica content of at least 99% by weight, preferably at least 99.5%, will therefore advantageously be employed.

A typical analysis of the fused vitreous silica which can be employed for constituting the grains (i), (ii) and (iv) is the following, in % by weight: $TiO_2$: <0.05%, $Al_2O_3$: ≦0.2%, $Fe_2O_3$: ≦0.03%, MgO: <0.05%, CaO: ≦0.02%, $Na_2O$: ≦0.05%, $K_2O$: ≦0.01% and $SiO_2$: the remainder to 100%.

For these same reasons, use should be avoided, as ingredient (iii), of fume silicas originating from the manufacture of ferrosilicons and of silicon because these fume silicas are rich in $Na_2O$ (0.3% by weight and more), SiC (>0.2% by weight), carbon (>0.2% by weight) and $Fe_2O_3$ (>0.15% by weight) and, at the present time, there is no known process which makes it possible to purify them effectively. When attempts are made to employ them in the process of the invention, these fume silicas give a material which, in addition to a colour which greatly reduces its commercial value, is subject to bubbling in contact with molten glasses.

It has been found, on the other hand, that fume silicas produced in the course of melting and reduction of zircon in an electrical furnace, for example as described in FR-A-1,191,665, are suitable for the process of the invention.

These fume silicas are made up of substantially spherical particles and have the following typical analysis, in % by weight $ZrO_2$ = 1.3–2.5%
$Al_2O_3$ = 2.1–3%
$Fe_2O_3$ = 0.10–0.16%
$Na_2O$ = 0.09–0.16%
$K_2O$ = 0.05–0.07%
CaO = 0.01–0.06%
$TiO_2$ = 0.01–0.02%
C < 0.015%
SiC: not measurable (i.e. less than 0.01%)
$SiO_2$ ≈ 95% (by difference), have a density of approximately 2.2 tons/m³, a BET specific surface approximately of 12 to 18 m²/g, and a median diameter, as determined by sedimentation analysis (sedigraphy) of the particles, of 0.2 to 0.6 μm. Fewer than 30% of the particles of these fume silicas have a diameter greater than 1 μm, but it may happen that several particles will agglomerate into a lump of several micrometers.

The water employed for the preparation of the fluid mixture will be advantageously a demineralised water, always to reduce the entry of detrimental impurities and to minimise the risk of devitrification.

The production of the various grains (i) and (ii) of fused vitreous silica is advantageously performed by dry grinding of commercially available crushed fused silica, for example in ball mills whose walls are lined with a protective refractory material, for example based on alumina or with the so-called AZS (alumina-zirconia-silica) type material or another protective lining, and in which the grinding media are made of a material intended to limit contamination of the ground product, especially by iron. The properties defined for the fine grains (ii) are typical of grains produced by dry grinding.

The presence of the two particle size fractions (i) and (ii) combined with that of the fume silica (iii) makes it possible to maximise the density of the final material by virtue of the compactness of the arrangement of the grains and of the fume silica particles.

To give an indication, it is possible to employ as grains (i) a particle size fraction which has the following distribution:

| Sieve opening in μm | Cumulative retention (in % by weight) | |
|---|---|---|
| | minimum | maximum |
| 1000 | 0 | 5 |
| 500 | 5 | 15 |
| 200 | 30 | 50 |
| 100 | 60 | 80 |
| 40 | 80 | 95 |

Furthermore, the presence of the fume silica surprisingly has the effect of reinforcing the corrosion resistance of the parts of the final sintered material which consist of the fine fraction and makes it possible, as it were, to obtain approximate uniformity of the corrosion resistance of the parts of the material originating from the coarse fraction (which are normally more resistant) and of the parts originating from the fine fraction (which are normally more easily attacked). In addition, the use of fume silica makes it possible to minimise the quantity of water required for the preparation of the fluid mixture, and this reduces the setting time of the cast article and consequently permits more rapid demoulding.

It should be noted that, remarkably, the particles of the fume silica remain in the form of identifiable discrete entities in photomicrographs of the final sintered material, whether it be newly manufactured or after use. These particles, which are disseminated in the material, retain their characteristic minor constituents such as $Al_2O_3$ and $ZrO_2$, as if they did not diffuse in the bulk of the material. These minor constituents are therefore not critical with regard to devitrification phenomena.

Besides the abovementioned essential and optional ingredients it is possible to include in the fluid mixture a small quantity, usually 0.05 to 1% by weight relative to the total weight of the fluid mixture, of a surface-active agent with the aim of modifying its rheological properties. This surface-active agent must be free from sodium and it is possible, for example, to employ a surface-active ammonium compound such as an ammonium polycarboxylate or an ammonium polyacrylate.

A specific example of such a surface-active agent is the product Dispex ® A40 sold by Allied Colloids.

The following nonlimiting examples are given with the aim of illustrating the invention.

The fume silica employed in the examples originated from a process of melting and reduction of zircon and analysed, in % by weight, as: $SiO_2$: ≈95%, $ZrO_2$: 2.1%, $Al_2O_3$: 2.3%, $Fe_2O_3$: 0.15%, $Na_2O$: 0.1%, CaO: 0.01%, $K_2O$: 0.06%, $TiO_2$: 0.015%, C=0.0105%, and SiC: not measurable (i.e. less than 0.01%).

The vitreous silica forming the grains (i) and (ii) analysed as 99.5% by weight of silica. Fraction (ii) was prepared by dry grinding of a coarser (2–4.76 mm) fraction of vitreous silica grains until fraction (ii) was obtained. The mill employed was a mill with alumina balls comprising inner walls coated with an electrofused material of the alumina-zirconia-silica type.

BRIEF DESCRIPTION OF THE DRAWING

The FIGURE is a photomicrograph of a polished material according to the instant invention.

EXAMPLE 1

Sacrificial components for the glass-making industry, such as flow orifices, sleeves and plungers were prepared by casting into a plaster mould a slip made up of, by weight:

silica grains (40–1000 μm)=54%
vitreous silica grains (<40 μm)=33%
fume silica=13% with addition of 0.09% of "Dispex A40" dispersant and 9% of demineralised water.

This manufacture takes place in the following manner:

The three components were premixed dry and were then progressively introduced into a take-in box mixer which contained the demineralised water and the dispersant so as to form a suspension or slip.

This slip was then degassed under vacuum (an operation which is desirable but not obligatory) before being cast into plaster moulds provided with filling funnels and adapted to the shape of the articles to be obtained.

These articles were allowed to set and were then dried in a ventilated oven at 200° C. and were finally arranged in a furnace and fired at 1050° C. in order to sinter them.

Characteristics of the fired sintered product:
Density: 1.910 $t/m^3$
Open porosity: 13%
Flexural strength: 20 MPa
Expansion coefficient: $0.6 \times 10^{-6}/K$
Chemical analysis:
$Al_2O_3 \leq 1\%$
$ZrO_2 \leq 1\%$
$Fe_2O_3 \leq 0.05\%$
$CaO \leq 0.05\%$
$Na_2O \leq 0.05\%$
others=traces
$SiO_2$: the remainder to 100%
Crystallographic analysis:
Cristobalite $\leq 2\%$ The microstructure of these new products is new and characteristic.

The single FIGURE, which is a photomicrograph produced at a magnification of approximately 800× of a polished sample of a material according to the invention, shows the existence of large grains 1 of vitreous silica bonded by a relatively continuous dispersion of finer grains 2 and of spherical particles 3 of fume silica.

Since the articles of Example 1 were intended to come into contact with molten glasses, various tests mentioned below were performed on them while comparing them to similar commercial articles whose characteristics are:

Density: 1.900 $t/m^3$
Open porosity: 13%
Flexural strength: 12 to 20 MPa
Expansion coefficient: $0.6 \times 10^{-6} K^{-1}$
Chemical analysis:
$SiO_2 \geq 99.5\%$
$Al_2O_3 = 0.2\%$
$Fe_2O_3 = 0.03\%$
$CaO = 0.05\%$
$Na_2O = 0.05\%$
$TiO_2 = 0.03$ MgO = 0.01
Crystallographic analysis:
Cristobalite ≤ 2%

* Behaviour in contact with a soda-lime glass:
Bubbling index: (1 hour at 1100° C. and 1 hour at 1350° C.)—according to the method described by A. Auerbach in the Reports on the Symposium on the Production of Glass, Madrid, 11–14 Sep. 1973, pages 259–312.
Product of the invention: 1 and 1
Reference product: 1 and 1
Stone release index (1300° C. for 24 hours)
Product of the invention: 0
Reference product: 0

This stone release index is carried out by employing the so-called "T-test" described by A. Auerbach in October 1972 in the paper for the Special Committee 2 of the DGG, Frankfurt-am-Main.

Dynamic corrosion index (at 1250° C. for 24 hours and at 1250° C. for 48 hours).
Product of the invention: 120
Reference product: 100.

This dynamic corrosion index is produced by using the so-called Pilkington test, described by A. Auerbach in October 1972, reference above.

* Behaviour in contact with borosilicate glasses:
Bubbling index at 1350° for 1 hour
Product of the invention: 2–3
Reference product: 7
Stone release index (1300° C. for 1 hour):
Product of the invention: 0
Reference product: 1

* Behaviour in contact with fluorine opal glass:
Under the same conditions the product according to the invention exhibits very good behaviour in the test for bubbling and stone release (index 0) in contact with fluorine opal glasses.

It should be noted that the slip of Example 1 can also be cast into moulds arranged on a vibrating table, with the advantage that in this case the quantity of water to be incorporated in the slip can be reduced to less than 8% by weight.

EXAMPLE 2

The same operating method as in Example 1 was used to prepare a large article whose thickness is greater than 100 mm, namely a furnace feeder gate for the manufacture of float glass, from a fluid mixture of the following composition by weight:
vitreous silica grains (2 to 4.76 mm) = 16%
vitreous silica grains (0.84 to 2 mm) = 27%
vitreous silica grains (40 μm to 1 mm) = 25%
vitreous silica grains (<40 μm) = 25%
fume silica = 7%
with addition of 0.09% of Dispex A40 dispersant and 6% of demineralised water.

The only difference in relation to Example 1 is that in this case the fluid mixture was cast into moulds arranged on a vibrating table subjected to vibrations (100 hertz) for 6 minutes.

After firing, the characteristics of the article were the following:
Density: 1.960 to 2.000 t/m$^3$
Open porosity: 9–10%
Flexural strength at 20° C.: 14–20 MPa
Expansion coefficient: $0.6 \times 10^{-6}$ K$^{-1}$
Chemical analysis:
$Al_2O_3 \leq 1\%$
$ZrO_2 \leq 1\%$
$Fe_2O_3 \leq 0.05\%$
$CaO \leq 0.05\%$
$Na_2O \leq 0.05\%$
others: traces
$SiO_2$: the remainder to 100%.
Crystallographic analysis:
Cristobalite ≤ 2%.

The material of this article exhibits the same behaviour as that of Example 1 in the bubbling and stone release tests. The following observations were made in a dynamic corrosion test in contact with soda-lime glass at 1250° C.
Material of Ex. 2 = 130
Material of Ex. 1 = 120
Reference material = 100

The material of Example 2 exhibits the same typical microstructure as that of Example 1.

Furthermore—a fact which is surprising—in the tests for sacrificial articles in contact with the glasses described above it was found that, after use with heating, the reference articles crack completely on cooling when these articles are replaced, which makes them tricky to handle, whereas the articles according to the invention do not exhibit this cracking and their handling is easy.

This phenomenon is due to the high devitrification of the reference articles. These tests show that the major impurities introduced by the fume silica employed in the invention, especially aluminium oxide and zirconium oxide, are not critical with regard to devitrification phenomena and confirm the fact that these impurities diffuse very little within the bulk of the article.

EXAMPLE 3 (Comparative)

In order to verify whether the quality of the fume silica introduced was critical, we have attempted to carry out three tests repeating Examples 1 and 2, but employing
a) a commercial fume silica originating from the reduction of ferrosilicon
b) colloidal silica
c) ground fused silica.

a) A commercial thermal silica of ferrosilicon type was employed, the chemical analysis (%) of which is:
$SiO_2O_2 = 94-98\%$
$Al_2O_3 = 0.1-0.3\%$
$SiC = 0.2-0.7$
$Fe_2O_3 = 0.15-0.4$
$Na_2O = 0.3-0.5$
$CaO = 0.1-0.3$
$K_2O = 0.2-0.6$
$TiO_2 = 0.01-0.02$
$C = 0.2-1.3$
BET specific surface = approximately 35 m$^2$/g
Median diameter, by sedimentation analysis = 0.25 to 0.30 μm.

It was found that the quantity of processing water had to be increased by approximately 1% in relation to the quantities indicated in the examples according to the invention, and that after firing the articles were pink-coloured, cracked and had a lower density (1.8 t/m$^3$).

A bubbling test carried out according to the method indicated gave a very high index: 9–10.

We estimate therefore that the use of this type of fume silica in this state is to be ruled out. However, it is obvious that if purification treatments made it possible to reduce or even to eliminate the components of the SiC and C type, without modifying the microspherical shape of the particles, this fume silica could become usable in the invention.

b) a commercial colloidal silica of trademark Ludox ®, sold by E.I. Du Pont de Nemours, of ammonium-stabilised AS40 type and containing 40% of silica with a particle diameter of 21 nm was employed.

Complete replacement of fume silica with this colloidal silica cannot be envisaged because in Ex. 1 it would be necessary to introduce 32.5% of colloidal silica (that is 13% of $SiO_2$ and 19.5% of water), which would result in an excess of water in the mixture.

Similarly, in Ex. 2 it would be necessary to introduce 17.5% of colloidal silica (7% of $SiO_2$ and 10.5% of water).

The association of fume silica with colloidal silica, e.g. 6% of fume silica according to the invention with 3 to 7% of colloidal silica is more realistic but, with a percentage of 7% of colloidal silica, this results in mixtures of high viscosity which are difficult to degas and which, on drying, give microcracking of the articles.

c) Replacement of fume silica with ground or microground fused silica of the same particle size has resulted in articles which after firing do not have the physical characteristics of the invention, namely a low density (1.7 t/m$^3$) and very low flexural strength (<5 MPa) at 20° C.

The material of the invention constitutes a material of choice for all applications in which sintered vitreous silica is employed.

It is obvious that the embodiments described are merely examples and that they could be modified, especially by substitution of technical equivalents, without departing thereby from the scope of the invention.

We claim:

1. A refractory material consisting essentially of sintered grains of fused vitreous silica and substantially spherical particles of fume silica which are visible in the form of dispersed separate entities in a photomicrograph, said grains of fused vitreous silica containing at least 99% by weight of silica, said refractory material having the following analysis, in % by weight: $Al_2O_3 \leq 1\%$, $ZrO_2 \leq 1\%$, $Fe_2O_3 \leq 0.05\%$, $CaO \leq 0.05\%$, $Na_2O \leq 0.05\%$, others: traces, the remainder to 100% being $SiO_2$, having a content of cristobalite not higher than 2% by weight, and a bubbling index not higher than 3 when tested in contact with borosilicate glasses at 1350° C. for 1 hour.

2. The material according to claim 1, wherein the $Al_2O_3$ and $ZrO_2$ contents are substantially present in said particles of fume silica.

3. The refractory material according to claim 1, wherein the amount of particles of fume silica in said refractory material is 3 to 15% by weight.

4. A mixture consisting essentially of grains of fused vitreous silica and particles of fumed silica, which is produced by dry mixing: which is produced by dry mixing:

(i) a moderately coarse particle size fraction of fused vitreous silica grains, in which at least 80% by weight of the grains are between 40 μm and 1 mm, (ii) a fine particle size fraction of fused vitreous silica grains, in which at least 95% by weight of the grains are smaller than 40 μm, the said silica grains (ii) having a BET specific surface of 6 to 9 m$^2$/g and a median diameter, as measured by sedimentation analysis, of 5 to 6 μm;

(iii) substantially spherical particles of fume silica comprising by weight, at most 2.5% of $ZrO_2$, at most 3% of $Al_2O_3$ at most 0.16% of $Fe_2O_3$, at most 0.16% of $Na_2O$, at most 0.07% of $K_2O$, at most 0.06% of $CaO$, at most 0.02% of $TiO_2$, less than 0.015% of C, and $SiO_2$ for the remainder to 100%, and (iv) optionally, at least one particle size fraction of fused vitreous silica grains which are coarser than fraction (i), the constituents (i), (ii), (iii) and (iv) being employed in the following proportions by weight in relation to the total weight of (i)+(ii)+(iii)+(iv): (i) 15-70%, (ii) 15-55%, (iii) 3-15% and (iv) 0-52% and the constituents (i), (ii) and (iv) being comprised of a fused vitreous silica containing at least 99% by weight of silica.

5. The mixture according to claim 4, wherein (i) is present in a proportion of 30-70%, (ii) of 15-55%, (iii) of 3-15%, and (iv) is absent.

6. The mixture according to claim 5, wherein (i) is present in a proportion of 45-60%, (ii) of 27-40% and (iii) of 7-13%.

7. The mixture according to claim 4, wherein (i) is present in a proportion of 15-35%, (ii) of 15-35%, (iii) of 3-15%, and (iv) of 27-52%.

8. The mixture according to claim 7, wherein (i) is present in a proportion of 20-30%, (ii) of 20-30%, (iii) of 7-13% and (iv) of 33-47%.

* * * * *